United States Patent [19]

Redman

[11] Patent Number: 4,730,477
[45] Date of Patent: Mar. 15, 1988

[54] WORKPIECE FEEDING-EJECTION MECHANISM

[75] Inventor: Robert J. Redman, Indian River, Mich.

[73] Assignee: Tube Fab of Afton Corporation, Afton, Mich.

[21] Appl. No.: 6,805

[22] Filed: Jan. 27, 1987

[51] Int. Cl.⁴ .............................................. B21D 43/16
[52] U.S. Cl. ........................................ 72/424; 72/346; 72/361; 221/239
[58] Field of Search ................. 72/110, 111, 346, 361, 72/419, 424, 427; 221/239, 294

[56] References Cited

U.S. PATENT DOCUMENTS

| | | |
|---|---|---|
| 1,516,146 | 11/1924 | Buckingham ...................... 221/239 |
| 2,622,488 | 12/1952 | Payne ................................ 221/239 |
| 2,998,125 | 8/1961 | Hahn et al. ......................... 72/424 |
| 3,007,181 | 11/1961 | Felber ................................ 72/424 |
| 3,199,724 | 8/1965 | Domenico et al. . |
| 3,433,388 | 3/1969 | Seeloff . |
| 3,584,761 | 6/1971 | Flanigan . |
| 3,587,822 | 6/1971 | White . |
| 3,796,347 | 3/1974 | Hafner . |
| 3,920,131 | 11/1975 | Gebel . |

FOREIGN PATENT DOCUMENTS 770608 10/1980 U.S.S.R. ............................... 72/424

Primary Examiner—Robert L. Spruill
Assistant Examiner—Donald R. Studebaker
Attorney, Agent, or Firm—Basile and Hanlon

[57] ABSTRACT

Apparatus for feeding, locating and ejecting tubular workpieces to and from a horizontal recess in a vertical die face wherein the workpiece projects beyond the opposite sides of the die includes a horizontally reciprocable feed means mounted for reciprocatory movement between a forward and rearward movement relative to the fixed die. The feed means includes a horizontal pusher plate which upon movement from its rearward end to its forward end limit pushes a horizontally disposed workpiece forwardly across the top of the die and over the front edge of the die. Horizontal locator bars stop the falling workpiece in front of the recess and fingers carried on spaced side plates of the feed means guide the workpiece downwardly along the die face. Upon rearward movement of the feed means from its forward end limit, the fingers pivot against biasing means to ride upwardly over the workpiece which at this time is clamped in the recess by a movable die.

6 Claims, 11 Drawing Figures

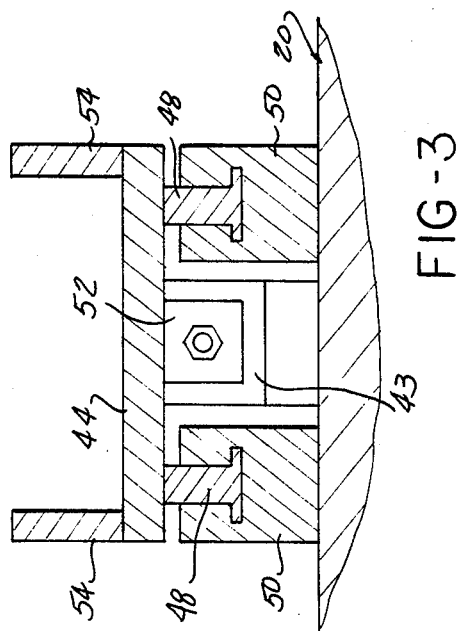
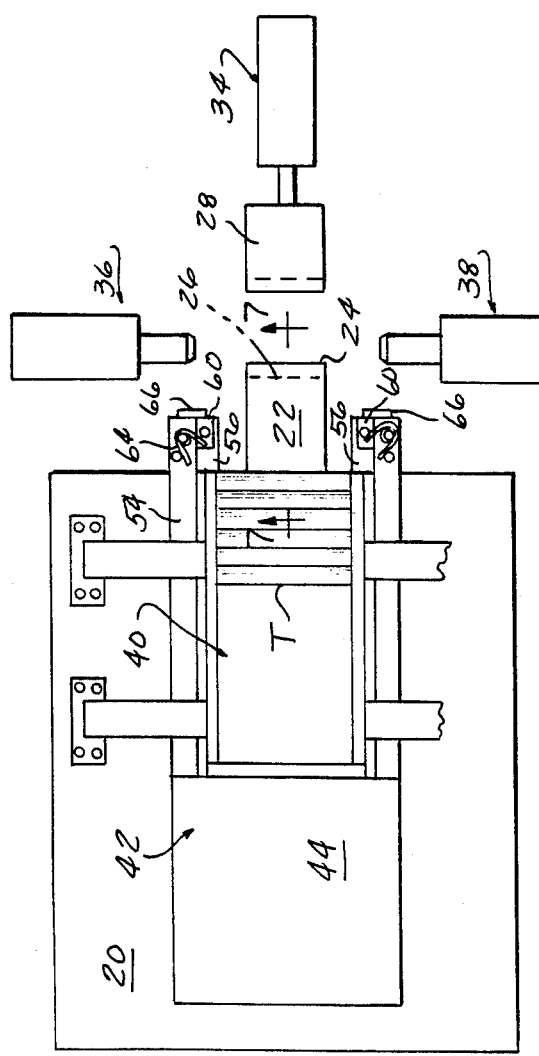
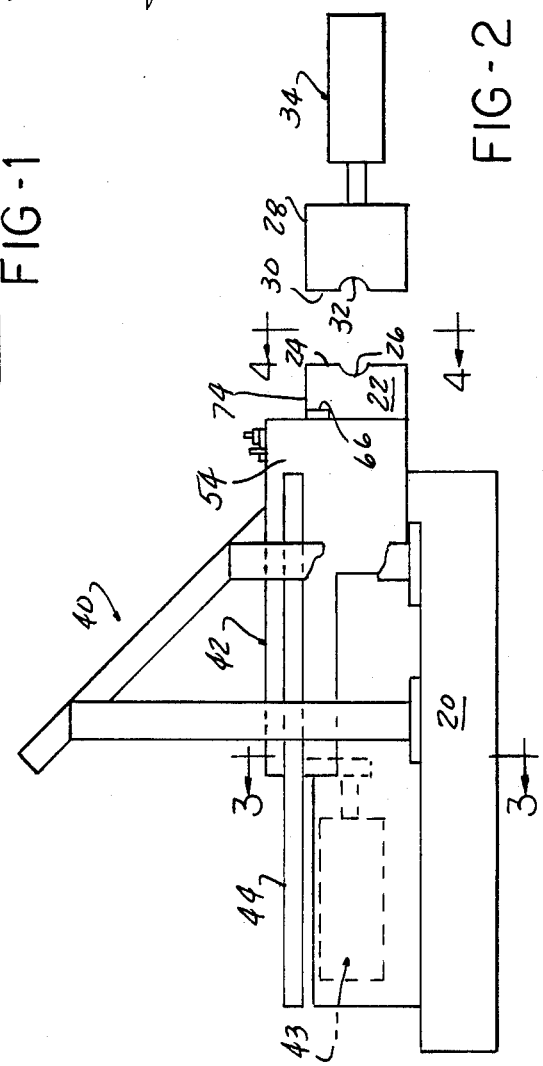

WORKPIECE FEEDING-EJECTION MECHANISM

BACKGROUND OF THE INVENTION

The present invention is directed to a workpiece feeding-ejection mechanism employed in conjunction with a die assembly operable to hold a tubular workpiece in a fixed position with the opposite ends of the workpiece projecting from the respective opposite sides of the die assembly so that reciprocable punches may simultaneously flare or expand the two opposite ends of the tubular workpiece.

In the mass production fabrication of metal tubing components for use in fluid pressure circuits, such as automotive vacuum operated circuits, it is frequently necessary to form a straight length of tubing with an enlargement or bead at each end. Where such a length of tubing needs to be formed with an enlargement only on one end, it is quite simple to feed an elongate length of tubing stock axially to a work station where the leading end portion of the stock is clamped and its leading end expanded while the trailing end is simultaneously being cut at the desired length from the stock. However, this process is not particularly feasible where both ends of the finished tubing must be expanded. Before the the end of the tubing which is cut free from the stock can be expanded, it must be moved clear of the piece of stock from which it has been severed and the cutting mechanism must be cleared from the action of the expanding tool. Subsequent feeding of a piece of tubing with one end expanded presents complications.

Where both ends of a length of tubing are to be formed simultaneously, it is essential that the tubing length be accurately aligned in three axes relative to the opposed forming tools which will operate on the opposite ends of the tubing. The tubing must be fed into initial alignment with tubing receiving recesses in a clamping die and held in this alignment while the dies are closed. After the forming operation has been completed, the formed tube must be ejected or extracted in some manner from the die so that a new blank can be fed into position. Experience has shown that simplification of the feeding steps complicates the extraction or ejection of the finished part and vice versa.

The present invention is directed to a feeding and ejection arrangement for tubing lengths which utilizes gravity in the final feeding step and in the ejection step and provides for a positive ejection of the finished part by the employment of a relatively simple and positive acting mechanism.

SUMMARY OF THE INVENTION

In accordance with the present invention, a clamping die assembly is constituted by a fixed die and a horizontally reciprocable movable die having opposed vertical die faces formed with cooperating recesses which will fixedly clamp a tubular workpiece when the die is closed. The horizontal width of the die face is less than the length of tubing handled by the die so that when the tube is clamped in position within the die, the opposite ends of the tube project from the respective opposite sides of the die.

The fixed die is formed with a flat-top surface across which a slide member may be horizontally reciprocated. A magazine containing a supply of tubing cut to uniform lengths is disposed above the slide and has a dispensing opening which will release one length of tubing when the forward end of the slide is withdrawn rearwardly clear of the dispensing opening. The length of tubing so released from the magazine is then pushed forward by the advancing slide to roll across the top surface of the fixed die until it is pushed over the front edge of the fixed die to drop, by gravity, downwardly along the front face of the fixed die.

The slide member carries with it a pair of opposed side plates spaced from each other by a distance slightly greater than the length of the tubing. The side plates project both above and below the top surface of the fixed die so that the tubing, which extends horizontally between the side plates, is axially aligned with the fixed die. At their forward ends, on the inner sides of the side plates, each side plate carries a fixed locator bar which has a top surface located at the same elevation as the lower edge of the tube receiving recess in the fixed die face. As the slide is moved forward, these surfaces project forwardly beyond the front face of the die at each side of the die so that when the tubing drops down the front face of the die, its opposite ends will rest on these two surfaces to be located in horizontal alignment with the die recess.

Each side plate also carries near its forward end at the inner side of the plate a guide finger pivotally mounted on the side plate at its upper end for pivotal movement about a horizontal axis parallel to the vertical plane of the front face of the fixed die. The lower ends of these guide fingers have a slight clearance above the supporting surface of the locating shoulders. The guide fingers are spring biased about their pivotal axes in a direction such that the lower ends of the fingers are biased rearwardly relative to the front face of the fixed die. Stops on the fingers are engageable with the side plates to limit pivotal movement of the lower ends of the fingers in this latter direction to a position such that they prevent the freely falling tube from moving forwardly relative to the fixed die face and retain the tube against forward movement relative to the fixed die while the opposite ends of the tube are supported upon the locating shoulders.

When the tube is so positioned in front of the recess in the fixed die, the movable die member may be driven to its closed position to fixedly clamp the tube in the recess, the fixed die passing freely between the fingers and locating shoulders. The slide member is then withdrawn, and as it withdraws, the fingers pivot against the action of their biasing means to ride up and over the length of tubing clamped in the die. The slide returns to its rearward end limit of movement to release another length of tubing from the magazine and during this movement, the forming tools operate on the end of the length of tubing clamped in the die.

The second length of tubing is then pushed forwardly across the top surface of the fixed die as before, and the die assembly is opened. As the slide moves toward its forward end limit of movement, the lower ends of the fingers will engage the workpiece in the fixed die to eject it from the recess of that die if it has not fallen freely from the die upon the opening of the die.

Other objects and features of the invention will become apparent by reference to the following specification and to the drawings.

IN THE DRAWINGS

FIG. 1 is a simplified top plan view of an apparatus embodying the present invention, with certain parts broken away or omitted;

FIG. 2 is a simplified side view of the apparatus of FIG. 1, again with certain parts broken away or omitted;

FIG. 3 is a detailed cross-sectional view taken on line 3—3 of FIG. 2;

Figure 4:
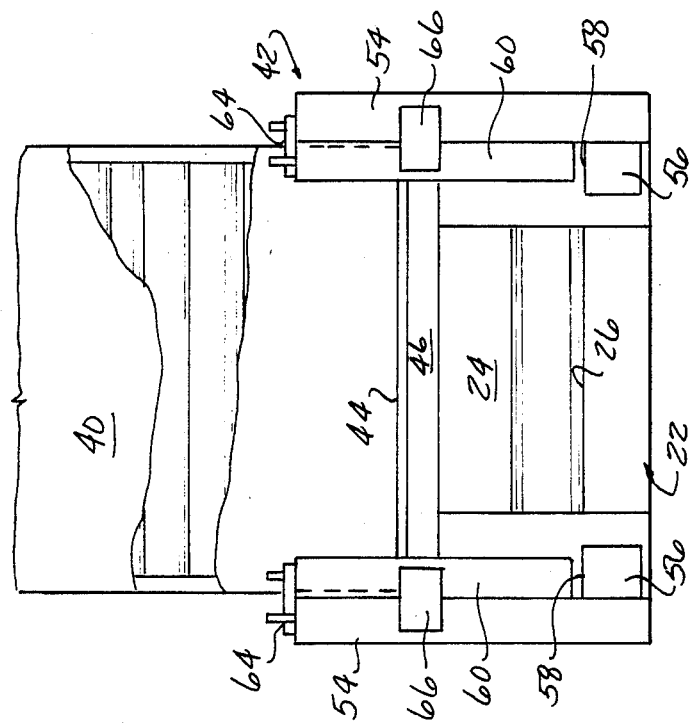
FIG. 4 is a front view taken approximately from line 4—4 of FIG. 2.
Figure 5:
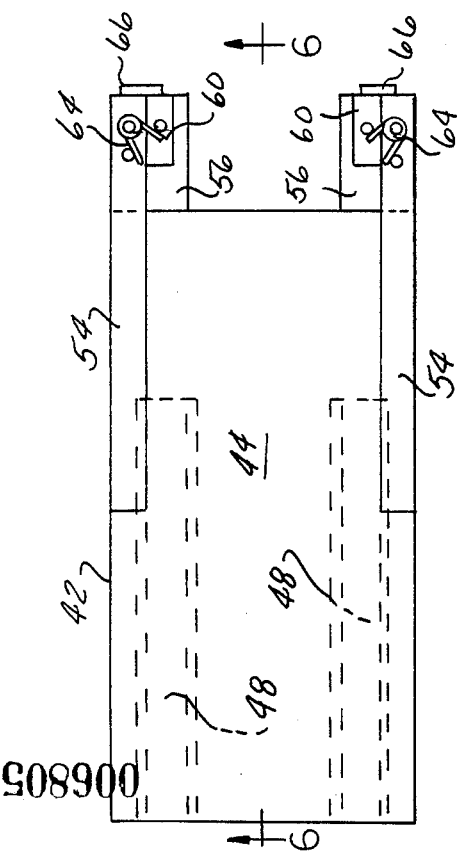
FIG. 5 is a top plan view of the slide assembly.

Referring first to FIGS. 1 and 2, simplified sketches, with certain parts omitted or borken away, of an assembly embodying the present invention are shown. The apparatus includes a fixed frame designated generally 20 upon which a fixed die member 22 is fixedly mounted to project from the front end (right hand end as viewed in FIGS. 1 and 2) of the frame. The front face 24 of the fixed die lies in a vertical general plane, and a semi-cylindrical recess 26 extends horizontally across the entire front face 24. A movable die member 28 is mounted in opposition to the fixed die 22 and is formed with a vertical die face 30. Die face 30 is formed with a semi-cylindrical recess 32. Movable die 28 is driven in horizontal reciprocatory movement as by a suitably mounted pneumatic motor designated generally 34 in horizontal reciprocatory movement between the opened position shown in FIGS. 1 and 2 and a closed position in which the two die faces 24, 30 are in substantial contact with each other. The recesses 26 and 32 in the respective die faces will clamp a length of cylindrical tubing T firmly between the closed dies for a forming operation performed by opposed forming tools 36, 38 (FIG. 1). The forming tools 36, 38 may take any of several forms and hence have been illustrated only schematically in FIG. 1.

Figure 7:
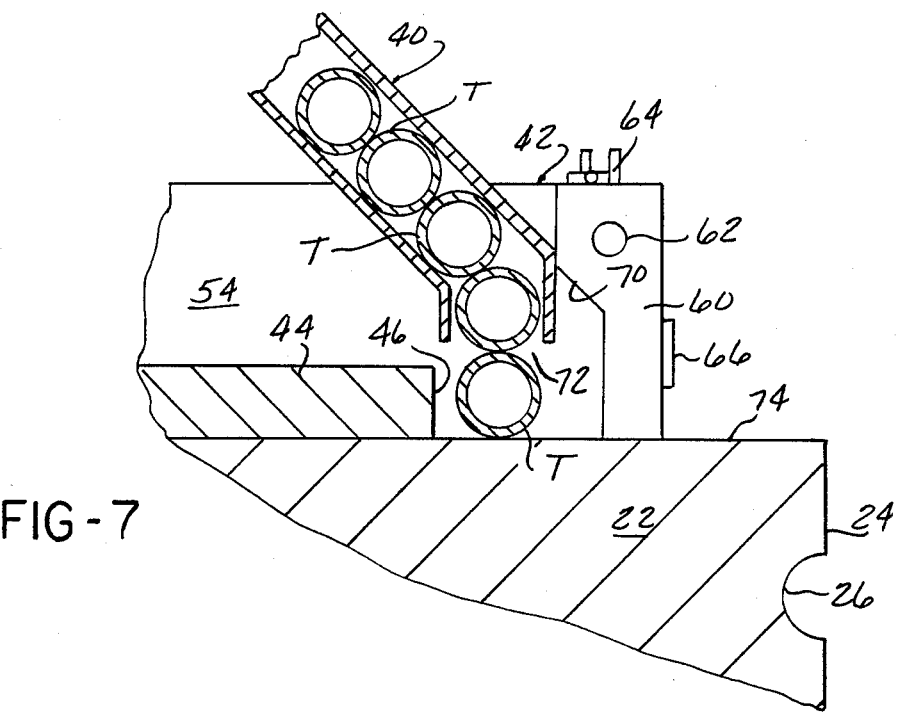
FIG. 7 is a detailed cross-sectional view taken approximately at the plane 7—7 of FIG. 1, showing details of the lower end of the magazine.
Figure 8:
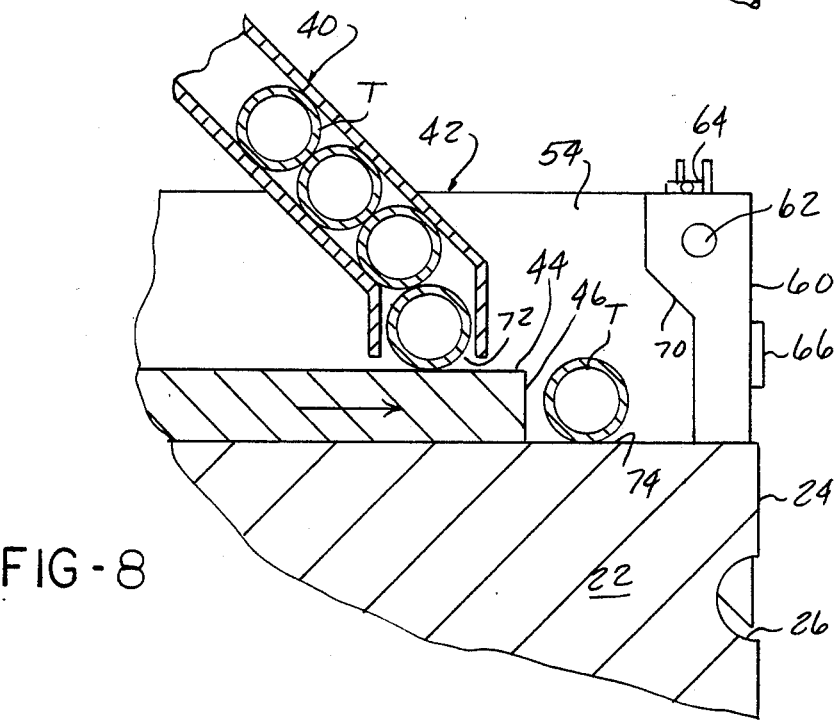
FIG. 8 is a view similar to FIG. 7, showing the slide moved somewhat forwardly from the position shown in FIG. 7.

Tubes T to be operated upon by the apparatus are supplied to the apparatus from a magazine designated generally 40 which provides an enclosed compartment in which individual lengths of tubing T are stacked in a fashion best shown in FIGS. 7 and 8.

A slide assembly designated generally 42 is mounted upon frame 20 for horizontal reciprocatory movement from right to left and vice versa as viewed in FIGS. 1 and 2. A pneumatic motor designated generally 43 may be employed to drive slide assembly 42 cyclically back and forth between a forward end limit (shown in FIG. 10) and a rearward end limit (FIG. 7). This movement of slide assembly 42 is employed to release tubular workpieces T one by one from the magazine, positively feed the workpieces into alignment with the die recesses, and to eject, when necessary, formed workpieces from the fixed die. Details of the slide assembly are best seen in FIGS. 3-6 and its operation best seen in FIGS. 7-11.

Referring first to FIGS. 3-6, slide assembly 42 is formed with a horizontal main plate 44 having a straight front edge 46. As best seen in FIG. 3, a pair of elongate feed arms 48 of T-shaped cross-section are fixedly secured to the underside of plate 44 in spaced parallel relationship and are slidably received within complementary slots in fixed frame members 50. A coupling bracket 52 (FIGS. 3 and 6) is fixedly secured to the underside of plate 44 midway between feed arm 48 to couple plate 44 to the piston rod of pneumatic motor 43.

A pair of vertically disposed opposed side plates 54 are fixedly mounted upon main plate 44 in spaced parallel relationship to each other, the spacing between side plates 54 slightly exceeding the length of tubing T handled by the apparatus, and hence the width of magazine 40 (see FIG. 1).

Figure 6:
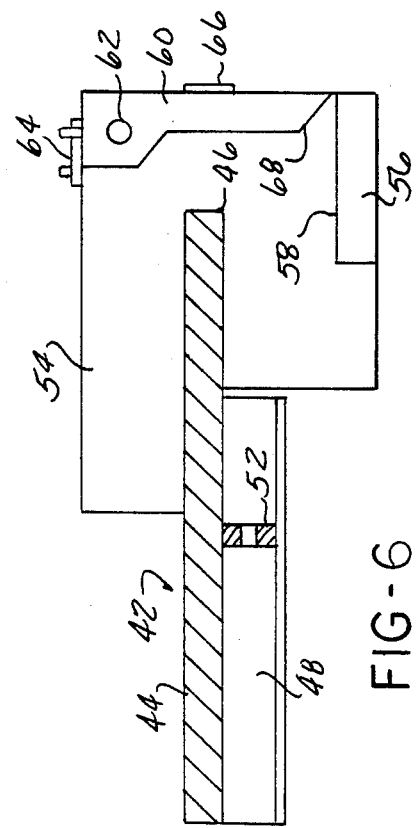
FIG. 6 is a detailed cross-sectional view of the slide assembly taken on line 6—6 of FIG. 5.
Figure 10:
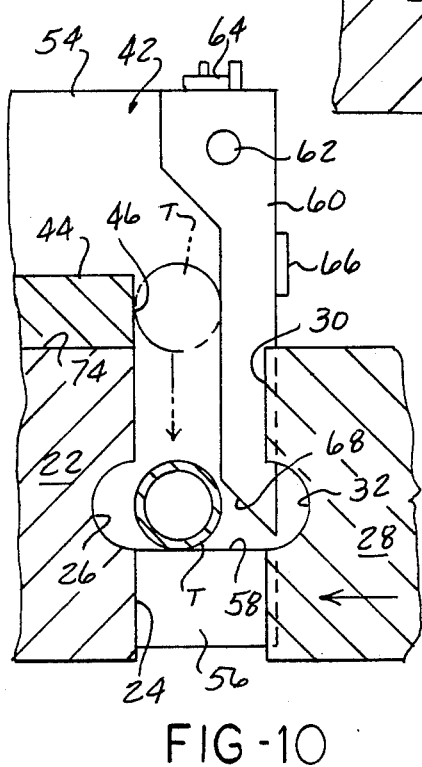
FIG. 10 is a view similar to FIG. 9, showing the slide at its extreme forward end limit of movement.

As best seen in FIGS. 4 and 6, the forward ends of side plates 54 project downwardly below top plate 44 to an elevation below the bottom of the recess 26 in fixed die 22. Along the lower edge of each side plate 54 near its front end, a locator block 56 is fixedly mounted to the inner side of each plate 54 to present a horizontal abutment surface 58 extending rearwardly from the front edge of each side plate 54. As best seen in FIGS. 4 and 10, the abutment surfaces 58 on the locator blocks 56 are at the same elevation as the lower edge of the recess 26 in the front face of fixed die 22.

Also located on the inner side of each side plate 54 adjacent its front end is an elongate finger 60 mounted upon the side plate near its upper end as by a pivot pin 62 for pivotal movement about a horizontal axis parallel to front face 24 of the fixed die. A torsion spring 64 is suitably wound around projecting pins or screws mounted in side plate 54 and the finger 60 to resiliently bias the fingers 60 about the axis of pivot pins 62 in a direction which biases the lower ends of finger 60 rearwardly or to the left as viewed in FIGS. 5-11. A stop plate 66 is fixedly mounted on the front edge of each finger 60 to project outwardly from the finger to engage the front edge of the associated side plate 54 to constitute an end limit to the pivotal bias supplied by springs 64 at which finger 60 extends vertically downwardly to the positions best shown in FIGS. 6 and 10.

The lower end of each finger 60 is beveled as at 68 and a second bevel 70 (FIGS. 7-11) may be provided to provide a clearance necessary in the operation of the device.

Operation of the slide assembly 42 in feeding tubing units T to the die recess 26 is best shown in FIGS. 7-11 which show portions of the die assembly and slide 42 at successive stages of a working cycle.

In FIG. 7, slide assembly 42 is shown at its rearward end limit of movement relative to fixed die 22. Referring briefly to FIG. 8, it is seen that when die slide assembly 42 is at any position forward of its rearward end limit, the main plate 44 underlies the dispensing opening 72 of the tube magazine 40 to prevent the discharge of a tube T from the magazine. Returning to FIG. 7, when slide assembly 42 is at its rearward end limit of movement, the front edge 46 of main plate 44 of the slide assembly is retracted rearwardly clear of the dispensing opening 72 of tube magazine 40 to thus enable the lowermost tube T in the magazine to drop downwardly through dispensing opening 72 onto the top surface 74 of fixed die 22. The distance between the top surface 74 of fixed die 22 and dispensing opening 72 is slightly greater than the diameter of a tube T, and thus only one tube T can clear the magazine at a time.

Referring now to FIG. 8, the slide assembly 42 is shown at the beginning of its forward stroke in which the tube T which dropped from the magazine in FIG. 7 is now being pushed forwardly by the advancing slide assembly across the top surface 74 of fixed die 22. The tube T being pushed forwardly by the advancing front edge 46 of main plate 44 in FIG. 8 is axially confined between the side walls 54 of the slide assembly with the opposite ends of the tubes T projecting outwardly beyond the opposed sides of fixed die 22 behind the fingers 60—note the relationship between the length of tubes T, the locations of finger 60 and the spacing between the side plates 54 illustrated in FIG. 4.

Figure 9:
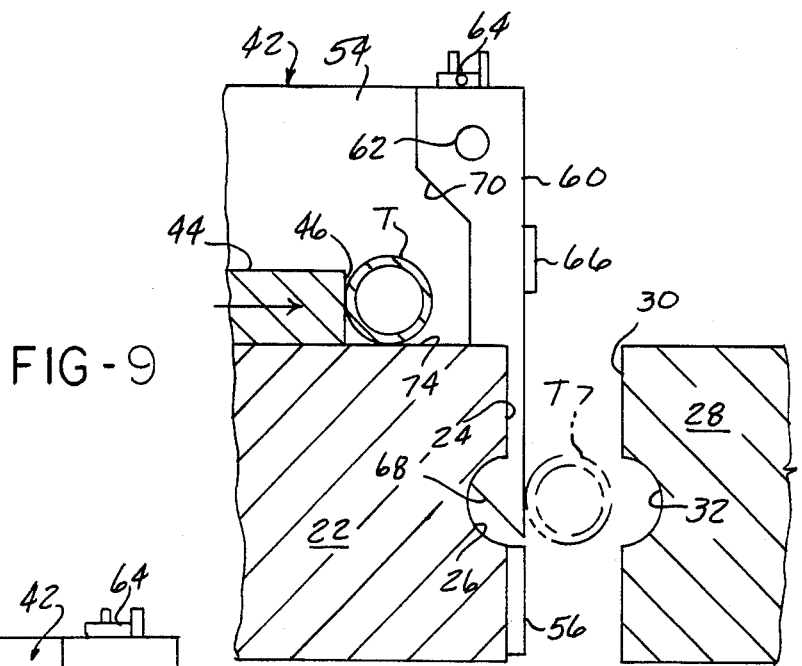
FIG. 9 is a cross-sectional view taken approximately on the plane 7—7 of FIG. 1, showing the slide approaching its forward end limit of movement.

In FIG. 9, slide assembly 42 is shown approaching its forward end limit of movement. It will be noted from FIG. 9 that at this particular stage of movement, fingers 60 have been advanced past the front face 24 of the fixed die, and the lower end of the finger in so passing will positively eject from recess 26 a finished tube T which may have remained in the recess 26 upon opening of the die. Suitable stationary abutments, not shown, may be provided at opposite sides of the path of moveable die 32 to provide for positive ejection of the part should it remain in recess 32.

In FIG. 10, slide assembly 42 is shown at its forward end limit of movement with the front edge 46 of main plate 44 co-planar with the vertical front face 24 of the fixed die. In moving to this position, it is believed apparent that the edge 46 will push the tube T beyond the front face of die 24 as indicated in broken line in FIG. 10 to allow the tube to drop by gravity downwardly along front face 24 until the opposite ends of the tube come to rest upon the abutment surfaces 58 provided by the locator blocks 56 on the slide assembly. As seen in FIG. 10, the abutment surfaces 56 thus horizontally align the tube with recess 26 in the front die face. Movable die 28 is then actuated, as indicated in FIG. 10, to begin to move toward its closed position. Fingers 60 confine the tube against any substantial forward movement away from fixed die 22 and prevent the tube from rolling off surfaces 58.

Figure 11:
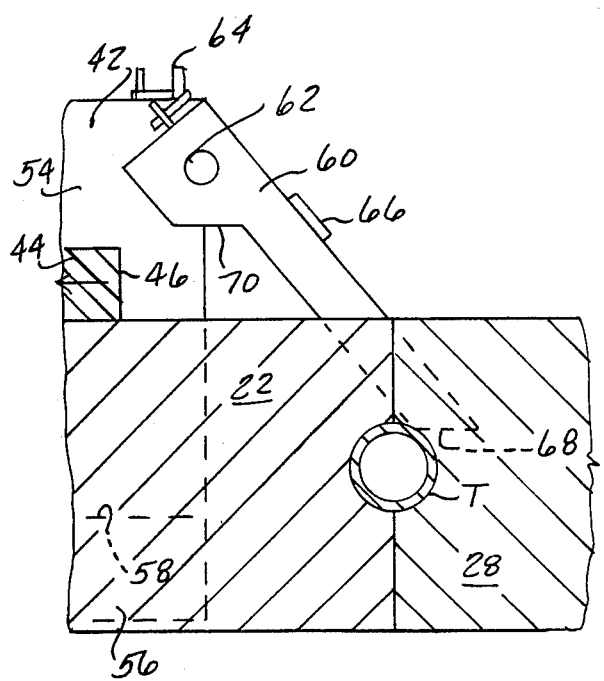
FIG. 11 is a view similar to FIG. 10, but showing the slide moved rearwardly from the position of FIG. 10.

Referring now to FIG. 11, slide assembly 42 is shown at the beginning of its rearward stroke from the forward end limit position shown in FIG. 10. Movable die 28 has fully closed, and the tube T is firmly clamped between the fixed and movable die. As the slide assembly 42 moves rearwardly, the fingers 60 pivot as shown in FIG. 11 against the biasing action of springs 64 to ride up and over the ends of the tube and to drop back down into their normal rest position as the lower end of the fingers clear the tube.

It will be appreciated that the motors 34 and 43 which drive the movable die 28 and slide assembly 42 in their reciprocatory strokes may be driven in coordinated cyclic movement by means of a suitable control system of a type well known to those skilled in the art.

While one embodiment of the invention has been described in detail, it will be appreciated that the disclosed embodiment may be modified in various details. The foregoing description is therefore to be considered exemplary rather than limiting, and the true scope of the invention is that defined in the following claims.

What is claimed is:

1. In a die assembly for releasably holding an elongate tubular workpiece in a fixed position with the longitudinal axis extending horizontally and the opposite ends of the workpiece projecting from opposite sides of said die assembly, said die assembly including a frame, a first die fixedly mounted on said frame and having opposite parallel vertical side walls spaced from each other by a distance less than the length of a workpiece, a vertical front face extending between and normal to said side walls and having a horizontal workpiece receiving recess extending entirely across said front face, and a flat top surface extending rearwardly between said side walls, a front edge at the top of said front face, and movable die means movable toward and away from said front face between an open position and a closed position and operable when in said closed position to fixedly clamp a tubular workpiece in said fixed position within said recess;

the improvement comprising reciprocating workpiece feed means mounted on said frame for reciprocatory movement relative to said first die between a forward and a rearward end limit of movement, workpiece holding magazine means mounted on said frame and operable when said feed means is at its rearward end limit to dispense a tubular workpiece onto said top surface of said first die with the axis of said workpiece parallel to and spaced rearwardly from said front edge and with the opposite ends of said workpiece projecting beyond the respective side walls of said first die, pusher means on said feed means operable upon movement of said feed means from its rearward end limit to its forward end limit to push the dispensed workpiece forwardly across said top surface beyond said front edge, finger means on said feed means for pivoting movement about a horizontal axis, said finger means operable when said feed means is at said forward end limit to guide said dispensed workpiece downwardly across said front face, vertical stop means on said feed means cooperable with said finger means when said feed means is at said forward end limit for positioning said dispensed workpiece in alignment with said recess in said front face, said finger means and said vertical stop means being located outwardly from said side walls and engageable with the portions of said workpiece which project beyond said side walls, and means operable upon rearward movement of said feed means from said forward end limit for pivotally disengaging said finger means and for reciprocally disengaging said vertical stop means from said dispensed workpiece.

2. The invention defined in claim 1 wherein said pusher means comprises a horizontally disposed main plate overlying said top surface of said first die and having a forward edge parallel to said front edge, said magazine means having a workpiece dispensing opening in its bottom spaced upwardly above said top surface of said first die by a distance slightly greater than the diameter of a workpiece and said main plate being horizontally movable between said top surface and said dispensing opening upon reciprocatory movement of said feed means, said forward edge of said main plate being located rearwardly of said opening when said feed means is at its rearward end limit to accommodate the gravitational release of a workpiece from said opening.

3. The invention defined in claim 2 wherein said finger means are located on said feed means in a forwardly spaced opposed relationship to said forward edge sufficient to accommodate the dropping of a single workpiece from said magazine means when said feed means is at said rearward end limit of movement.

4. In a die assembly for releasably holding an elongate tubular workpiece in a fixed position with the longitudinal axis extending horizontally and the opposite ends of the workpiece projecting from opposite sides of said die assembly, said die assembly including a frame, a first die fixedly mounted on said frame and having opposite parallel vertical side walls spaced from each other by a distance less that the length of a workpiece, a vertical front face extending between and normal to said side walls and having a horizontal workpiece receiving recess extending entirely across said front face, and a flat top surface extending rearwardly between said side walls, a front edge at the top of said front face, and movable die means movable toward and away from said front face between an open position and a closed position and operable when in said closed position to fixedly clamp a tubular workpiece in said fixed position within said recess;

the improvement comprising reciprocating workpiece feed means mounted on said frame for reciprocatory movement relative to said first die between a forward and a rearward end limit of movement, workpiece holding magazine means mounted on said frame and operable when said feed means is at its rearward end limit to dispense a tubular workpiece onto said top surface of said first die with the axis of said workpiece parallel to and spaced rearwardly from said front edge and with the opposite ends of said workpiece projecting beyond the respective side walls of said first die, pusher means on said feed means operable upon movement of said feed means from its rearward end limit to its forward end limit to push the dispensed workpiece forwardly across said top surface beyond said front edge, said pusher means comprising a horizontally disposed main plate overlying said top surface of said first die and having a forward edge parallel to said front edge, a pair of vertically disposed side plates fixed to said main plate in outwardly spaced parallel relationship to the respective side walls of said first die and projecting forwardly beyond said forward edge of said main plate, said side plates being spaced from each other by a distance exceeding the length of a workpiece, a pair of horizontally disposed locator bars fixedly mounted on the respective inner sides of said side plates and having horizontal upper surfaces located in horizontal alignment with the lower edge of said recess in said front face operable to engage the opposite ends of a workpiece to support the workpiece in horizontal alignment with said recess, finger means on said feed means operable when said feed means is at said forward end limit to guide said dispensed workpiece downwardly across said front face, said finger means comprising a pair of elongate finger means mounted on the respective inner sides of said side plates for pivotal movement about a horizontal axis located above said top surface, and means for biasing said finger means to a normal rest position wherein said finger means extend downwardly from said axis substantially to said locator bars, vertical stop means on said feed means cooperable with said finger means when said feed means is at said forward end limit for positioning said dispensed workpiece in alignment with said recess in said front face, said finger means and said vertical stop means being located outwardly from said side walls and engageable with the portions of said workpiece which project beyond said side walls, and means operable upon rearward movement of said feed means from said forward end limit for disengaging said finger means and said vertical stop means from said dispensed workpiece.

5. The invention defined in claim 4 wherein each of said fingers has a rear edge extending vertically when the finger is in its rest position and spaced forwardly from said front face of said first die by a distance slightly greater than the diameter of a workpiece when said feed means is at its forward end limit of movement.

6. The invention defined in claim 5 further comprising finger stop means engageable between said fingers and said side plates to establish said normal rest position.

* * * * *